Nov. 28, 1939.      W. P. SCHMITTER      2,181,537
COUPLING
Filed May 12, 1937
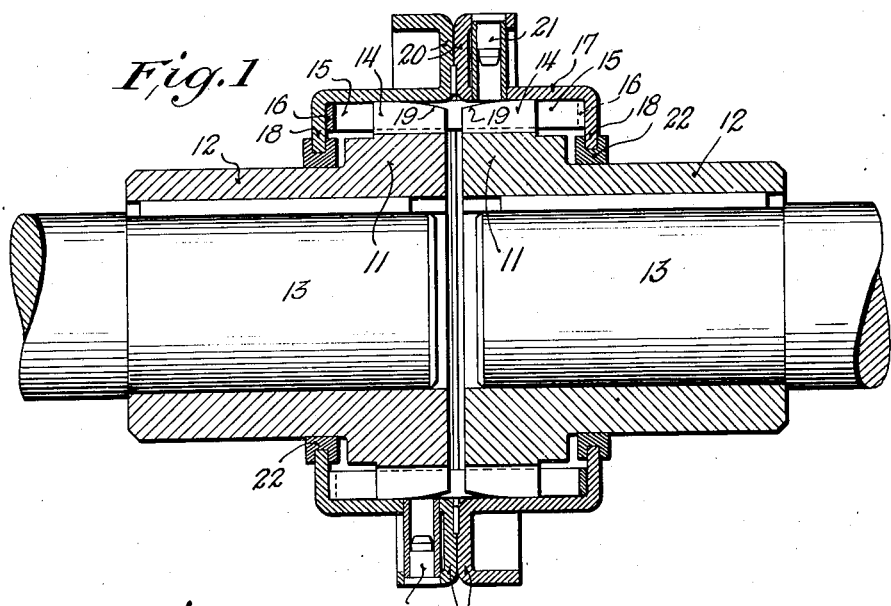
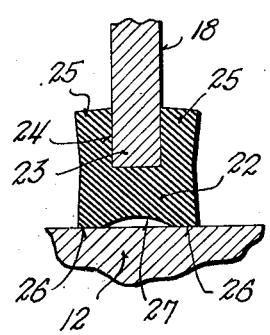
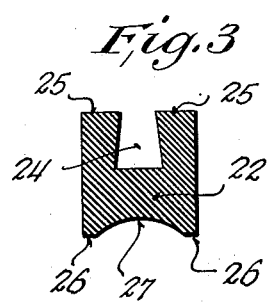
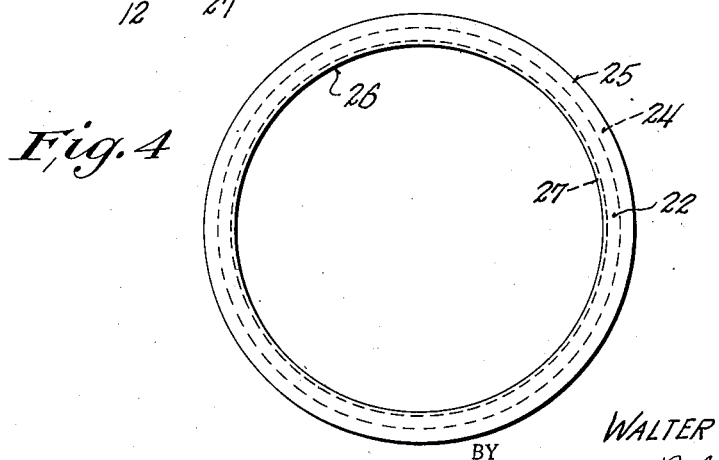
INVENTOR.
WALTER P. SCHMITTER
BY
ATTORNEY.

Patented Nov. 28, 1939

2,181,537

UNITED STATES PATENT OFFICE 2,181,537

COUPLING

Walter P. Schmitter, Milwaukee, Wis., assignor to The Falk Corporation, Milwaukee, Wis., a corporation of Wisconsin Application May 12, 1937, Serial No. 142,097

3 Claims. (Cl. 64—32)

This invention relates to power transmission couplings of the flexible type and particularly to lubricant seals therefor.

In present commercial forms of couplings of this type, the coupling disks and their connections are ordinarily surrounded by a lubricant retainer housing designed to provide substantial mechanical clearance at one or both of its ends of sufficient magnitude to permit the required relative tilting between the houing and at least one of the disks. An example of such a coupling is shown in the prior Patent No. 2,027,842 to myself and Percy C. Day in which the lubricant retainer housing is arranged to tilt with respect to both coupling disks and in which substantial mechanical clearance is provided between both ends of the housing and the coupling disk hubs for that purpose.

Although the effect of centrifugal force upon the lubricant is ordinarily sufficient to maintain an ample body of lubricant within the housing, nevertheless the clearances mentioned do permit objectionable discharge of lubricant, which under some conditions of operation proves quite serious, and also permit entry of dust and other foreign materials into the coupling.

One object of the present invention is to provide a coupling of the type mentioned which is effectively sealed against leakage and against admission of foreign matter thereinto, without impairing the required freedom of relative movement between the housing and coupling disk or disks.

Another object is to provide an effective flexible seal for coupling housings and the like.

Other objects and advantages will appear, either expressed or implied, from the following description of an illustrative embodiment of the present invention.

For purposes of illustration and description, the invention will be shown and described as embodied in a coupling of the form shown in the patent above identified, although it may be advantageously applied to couplings of other forms and to other uses.

In the accompanying drawing:

Figure 1 is a longitudinal sectional view of a flexible coupling sealed in accordance with the present invention.

Fig. 2 is an enlarged sectional view of the sealing ring shown in Fig. 1.

Fig. 3 is an enlarged sectional view of the sealing ring before application to the coupling, showing its original shape.

Fig. 4 is a plan view of the sealing ring.

The coupling illustrated in the drawing is very similar to that described in the patent identified above. It comprises a pair of disks 11 having integral hubs 12 keyed or otherwise fixed to the adjacent ends of shafts 13, either of which may be a driving shaft and the other a driven shaft. Each disk also has a series of peripheral slots 14 formed therein in substantial alignment with corresponding slots in the other disk. The disks are connected by a series of resilient strips or limbs 15 each engaged in slots of both disks and preferably interconnected at their ends 16 in a manner to form a grid like member substantially similar to that disclosed in the above identified patent.

The grid like member, with its limbs 15, is seated against the interior of an enclosing lubricant retainer housing 17 and confined between inwardly turned end flanges 18 of the housing. The housing 17 rides upon and is supported by the outer spherical surfaces 19 of the slotted portions of the disks 11, so that any relative radial displacement between the disks resulting from parallel misalignment of the shafts 13 will cause the housing 17 to tilt with respect to both disks.

To facilitate assembly and dismantling of parts, the housing 17 is preferably formed in two halves, axially separable along a mid-plane and having mating flanges 20 releasably joined by bolts or the like, not shown. Lubricant may be injected into the housing through appropriate fittings 21 of a well known type conveniently arranged in the peripheries of the housing halves.

In this instance the opposite ends of the housing are closed by flexible sealing rings 22 interposed between the inner edges 23 of the end flanges 18 and the adjacent coupling hubs 12 in a manner to bridge and seal the gaps therebetween without impairing the required freedom of tilt of the housing relative to the hubs. These rings serve to prevent leakage of lubricant from the housing and to exclude dust and foreign matter therefrom, and each includes novel features which render them very effective for the purpose and which will now be described.

Each ring 22 is formed of elastic material, preferably a synthetic rubber, such as Duprene, which is unaffected by lubricants. Each ring shown is provided with a relatively deep channel 24 formed in its outer periphery, adapted to receive the inner edge 23 of a housing end flange 18 and to form opposed ring-like lips 25 arranged to bear against the opposite faces of the end flange 18.

The channel 24, when formed, is preferably of tapered or dove-tail form with its maximum width at the base, as indicated in Fig. 3, so that slight separation of the lips 25 is required in order to admit the housing flange 18 therebetween, and so that, when assembled, the lips 25 naturally bear against the opposite faces of the flanges with slight gripping pressure.

The internal diameter of each ring 22, when formed, is preferably slightly less than the diameter of the hub 12 to which it is to be applied, so that, when applied, the ring is slightly tensioned and maintains a bearing pressure against the hub. The internal periphery of the ring is preferably shaped to form two marginal annular ribs 26 separated by an intermediate shallow channel or clearances 27, so that the pressure of the ring against the hub is concentrated along areas adjacent the side faces of the ring, and so that that pressure, reacting through the body of the ring, tends to increase the grip of the lips 25 against the flange 18. Due to this relation, the pressure between the flange 18 and the lips 25 reacts to increase the sealing pressure of the ring surfaces 26 against the hub 12.

It will of course be understood that although the contact pressures thus maintained between the lips 25 and flange 18 and between the ring and hub 12 are sufficient to provide a perfect seal, yet they are never so great but that the flange 18 may shift radially within the channel 24 and the ring may slip along the hub to accommodate all necessary tilting movement of the housing relative to the hub, and of course the yieldability of the material of each ring permits distortion of the ring in a manner to accommodate some tilting movement of the housing relative to a hub and without destroying the desired sealing contact between the ring and housing or ring and hub. For instance that yieldable portion of each ring between the outer channel 24 and inner channel 27 is free to accommodate itself to considerable inward radial movement of the flange 18 toward the hub 12, and the body of the ring is free to yield to appreciable movement of the housing flange 18 along the hub 12 without actually disturbing the position of the ring on the hub. It will also be understood that in the form of ring shown, any inward radial thrust of the flange 18 against the ring increases the pressure contact between the lips 25 and the flange as well as between the ring and its hub.

Various changes may be made in the embodiment of the invention hereinabove specifically described without departing from or sacrificing the advantages of the invention as defined in the appended claims.

I claim:

1. In a flexible coupling the combination of a pair of rotary coupling members, means forming a torque transmitting connection between said members, a lubricant retainer housing surrounding said members and said means, said housing being supported by said members at points intermediate the ends of said housing and being disposed to tilt relative to both of said members to accommodate misalignment between said members, and a lubricant retaining ring of flexible material surrounding each of said members and engaged with one end of said housing, each of said rings having circumferential end ribs on its inner periphery for peripheral engagement with said member and having a portion between said ribs reduced in thickness to permit deformation of said ring in accommodation of radial movement of the ends of said housing as said housing tilts with respect to said member.

2. In a flexible coupling the combination of a pair of rotary coupling members, means forming a torque transmitting connection between said members, a lubricant retainer housing surrounding said members and said means and disposed to tilt relative to both of said members to accommodate misalignment therebetween, an inwardly directed flange at each end of said housing, the inner periphery of said flange moving radially and axially in response to tilting of said housing, a lubricant retaining ring of flexible material engaged with each of said flanges and in peripheral engagement with one of said members, each of said rings having on its inner periphery a pair of relatively thin annular ribs deformable to permit axial movement of said flange while maintaining gripping engagement with said member, each of said rings also having a portion between said ribs reduced in thickness to permit deformation of said ring in accommodation of radial movement of said flange as said housing tilts with respect to said member.

3. In a flexible coupling the combination of a pair of adjacent coupling heads having hub portions, flexible torque transmitting means connecting said heads, a lubricant retainer housing supported upon said heads and rockable relative thereto in response to relative radial displacement between said heads, said housing having end walls directed inwardly toward said hub portions and movable relative thereto in response to rocking action of said housing, and a sealing ring of elastic material on each of said hub portions, each of said rings having inner and outer peripheries in continuous sealing contact with a hub portion and an adjacent end wall, respectively, in all rockable positions of said housing.

WALTER P. SCHMITTER.